(12) United States Patent
McRae

(10) Patent No.: US 7,710,947 B2
(45) Date of Patent: May 4, 2010

(54) VOICE OVER IP DEVICE WITH PROGRAMMABLE BUTTONS

(75) Inventor: Matthew McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1330 days.

(21) Appl. No.: 11/180,112

(22) Filed: Jul. 12, 2005

(65) Prior Publication Data

US 2007/0025278 A1 Feb. 1, 2007

(51) Int. Cl.
*H04L 12/66* (2006.01)
(52) U.S. Cl. .................. 370/352; 379/433.06
(58) Field of Classification Search ............ 379/433.06, 379/355.07, 355.01, 216.01, 93.24; 370/352, 370/353
See application file for complete search history.

(56) References Cited

U.S. PATENT DOCUMENTS

| | | | | |
|---|---|---|---|---|
| 6,298,131 B1* | 10/2001 | Veschi | ................ | 379/355.06 |
| 7,106,851 B2* | 9/2006 | Tang et al. | ............ | 379/355.01 |
| 7,526,081 B1* | 4/2009 | Vashisht et al. | ........ | 379/433.06 |
| 2007/0004424 A1* | 1/2007 | Sheen et al. | ............. | 455/456.1 |
| 2009/0055473 A1* | 2/2009 | Synnergren | ................. | 709/204 |

* cited by examiner

*Primary Examiner*—Creighton Smith
(74) *Attorney, Agent, or Firm*—Haynes and Boone, LLP.

(57) ABSTRACT

A VoIP device has at least one programmable button to enable the user to initiate a VoIP or SIP call to another device. The button can be programmed by the device user, the device manufacturer, and/or a VoIP service provider. The VoIP device does not have a dial pad, visual numbers display, or other certain standard features on a SIP phone. Thus, the VoIP device allows simplified dedicated communication. Numerous uses are possible, which result in advantages over conventional SIP phones.

27 Claims, 2 Drawing Sheets ized as defined by IP, and communicated over the Internet for telephone-like communication. Individual VoIP packets may travel over different network paths to reach the final destination where the packets are reassembled in correct sequence to reconstruct the voice information.
VOICE OVER IP DEVICE WITH PROGRAMMABLE BUTTONS

BACKGROUND

1. Field of Invention

The present invention relates generally to Voice over IP (VoIP) devices.

2. Related Art

Broadband and Voice over Internet Protocol (VoIP) telephone services are becoming more and more prevalent in today's communications. VoIP enables voice calls using Internet Protocol ("IP") networks, such as the Internet, corporate intranets, or any IP network, as an alternative to traditional public switched telephone networks ("PSTN"). Unlike the PSTN, which is circuit-switched, the Internet is packet-switched. As such, communication on the Internet is accomplished by transmitting and receiving packets of data. In addition to data, each packet contains a destination address to ensure that it is routed correctly. The format of these packets is defined by the IP. One type of allowable data is encoded, digitized voice, known as Voice over IP. VoIP is voice that is packetized as defined by IP, and communicated over the Internet for telephone-like communication. Individual VoIP packets may travel over different network paths to reach the final destination where the packets are reassembled in correct sequence to reconstruct the voice information.

As broadband penetration continues to rise, device manufacturers and service providers are looking towards increased uses for VoIP services. Session Initiation Protocol (SIP) enables multi-user sessions regardless of media content using VoIP networks. SIP is a signaling protocol that can initiate, manage, and terminate voice sessions across packet networks, resulting in increased functionality and capability over traditional analog phones, digital phones, and even VoIP phones. A common feature in these types of phones, including SIP phones, is a dial pad, which enables the user to connect to a desired destination device by entering the appropriate sequence of numbers.

However, this has some inherent disadvantages. For example, when the user is in a hurry, remembering a desired phone number may be difficult and then entering the number can also add increased delays. Many phones now have speed dial buttons or pre-programmed buttons that enable the user to dial a number by simply pressing one button. However, a dial pad is still required in order to program the buttons, and a display is typically present, both of which increase the cost of the phone. Such phones can add additional cost since they can be used to call virtually any number and may have many other features other than just calling. The ability to call any number, while providing the user increased flexibility, also makes it hard to limit the types of calls from the phone.

Therefore, there is a need for a VoIP device that allows communication with another device while overcoming the disadvantages of conventional devices and methods discussed above.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to one embodiment of the present invention, a Voice over Internet Protocol (VoIP) device has one or more programmable buttons with no dial pad, where the programmable buttons enable a user to initiate a Session Initiation Protocol (SIP) call to a pre-determined number or device. One aspect of the invention provides a simple VoIP device that enables SIP calling to allow the user (or service provider) to customize the device of a specific need or application and obtain significant advantages over conventional VoIP or SIP phones.

Figure 1:
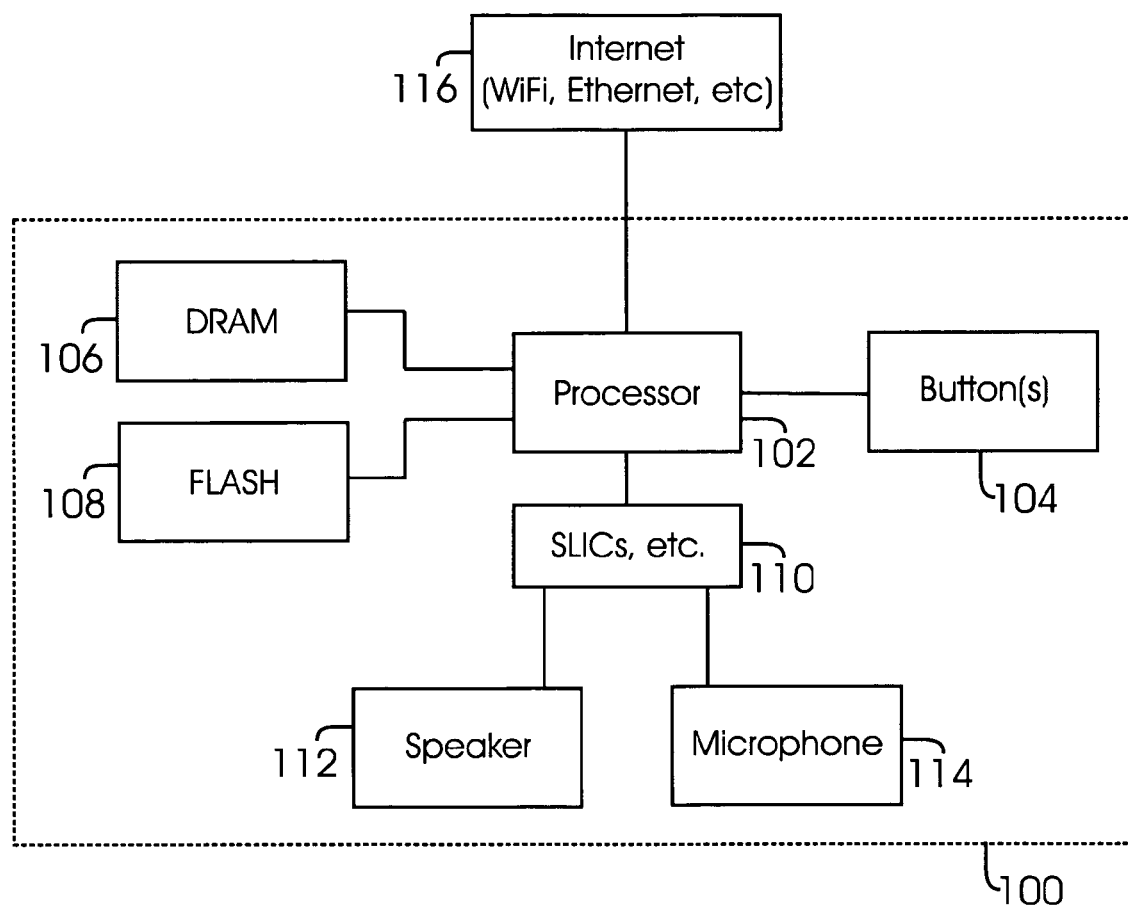
FIG. 1 is a block diagram of a Voice over IP (VoIP) device according to one embodiment of the present invention.

FIG. 1 is a block diagram of a VoIP device 100 according to one embodiment of the present invention. VoIP device 100 includes a processor 102 coupled to one or more buttons 104 on the exterior of the device. Processor 102 is responsive to signals sent by depressing the one or more buttons. Also coupled to processor 102 are memory, such as a flash memory 106 and a dynamic random access memory (DRAM) 108. Processor 102 is capable of writing to and reading from flash memory 106 and RAM 108 as needed for operation of the device and to enable the user to communicate through wireless channels using the device. Subscriber Line Interface Circuits (SLICs) 110 and/or other interface circuitry enable signals to be converted and transmitted to and from audio components, such as a speaker 112 and/or a microphone 114 incorporated into a headset or handset.

Voice signals to and from speaker 112 or microphone 114 are processed and transmitted through the Internet 116 for packetized communication, such as through a SIP call. The connection to the Internet for communication to another device can utilize any suitable networking technology, such as 802.11, MoCA (Multimedia over Coax Alliance), HomePlug (e.g., conformant to the 1.0 and AV specifications), HomePNA, WiMax, Bluetooth, WiFi, UWB (Ultra Wide Band), or Ethernet. The components of VoIP device 100 are similar to those of a SIP phone for enabling a VoIP call, such as a SIP call. However, VoIP device 100 is much simpler than a conventional SIP phone. For example, portions associated with dial pads, visual displays, and other assorted features of SIP phones are not present in VoIP device 100. VoIP device 100 uses a VoIP termination point, such as for SIP, Media Gateway Control Protocol (MGCP), and H.323 protocol.

According to one aspect of the invention, button(s) 104 are programmed so that a specific number is dialed when a button is pressed. As a result, a user can quickly and easily place a call with just a push of a button. A single button can also be programmed with multiple numbers, where a certain number is called depending on the time of day, day of week, or other time period. For example, VoIP device 100 can be programmed to call an office number during work hours and work days and a home number during night hours and weekends. When the user is on vacation, VoIP device 100 can be programmed to call a hotel, cell phone, or other number where the callee can be reached. There are numerous methods to program a button, either by the user or service provider, without an actual dial pad on the device. For example, the user may program the numbers for a button using a web-based graphical user interface (GUI) like a router or a local set-up wizard run on a PC that sends commands over a Local Area Network (LAN). User-programming provides more flexibility such that the user can program or re-program a button at any time.

A button may also be programmed using remote commands and/or management by the service provider (either the VoIP network provider or a value-added service provider) for the device. By having the service provider program numbers for the button(s), the user is relieved of actually doing it himself. Depending on the user's knowledge and/or the complexity of the programming method, this can be a significant advantage. Furthermore, programming by a service provider enables the service provider to maintain phone numbers remotely or as part of an installation service.

Figure 2:
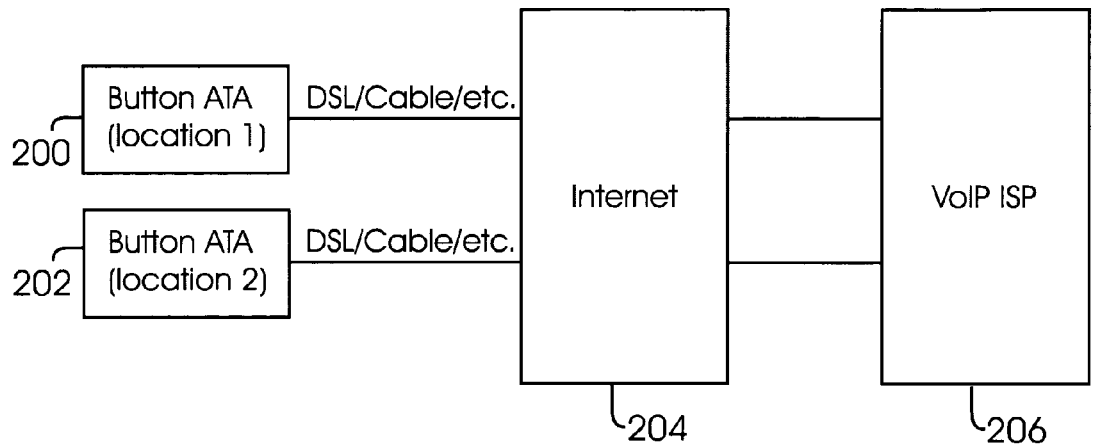
FIG. 2 is a block diagram of a system using the VoIP device of FIG. 1 according to one embodiment.

FIG. 2 is a block diagram of one type of application for VoIP device 100, in which the two communication devices are both VoIP devices. A first VoIP device 200, either at a fixed location or mobile, is pre-programmed to call a second VoIP device 202, also either at a fixed location or mobile. Pressing a pre-programmed button on first VoIP device 200 initiates a SIP or other VoIP call to second VoIP device 202. The call is sent through the Internet 204 via a VoIP Internet Service Provider (ISP) 206. In such an arrangement, the two VoIP devices can act as walkie-talkies (if both are mobile) or an intercom system (if one or both are fixed in location). In an intercom application, both devices can be within a house or office, one inside and one outside, or both outside.

Figure 3:
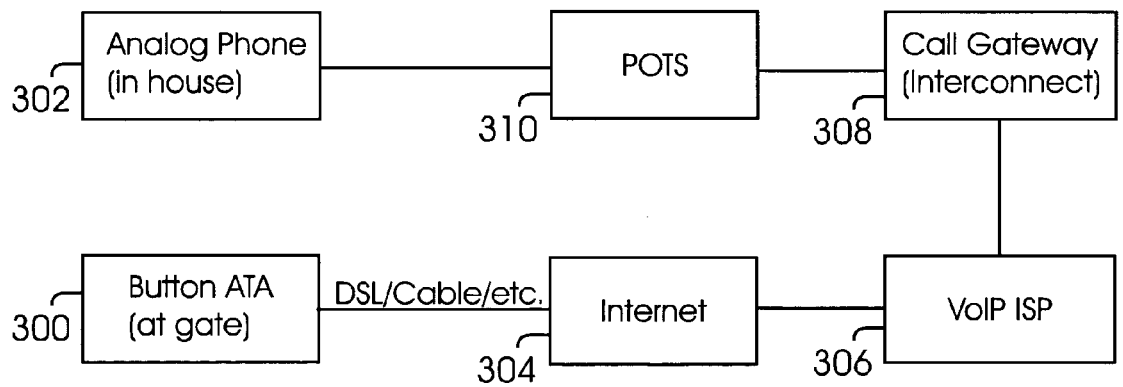
FIG. 3 is a block diagram of another system using the VoIP device of FIG. 1 according to another embodiment.

FIG. 3 is a block diagram of another type of application for VoIP device 100, in which one communication device is a VoIP device and the other one is an analog phone, such as within a home or office. A VoIP device 300 is pre-programmed to dial the number of an analog phone 302. Once a button corresponding to analog phone 302 is pressed, a VoIP or SIP call is placed through the Internet 304 via a VoIP ISP 306. VoIP ISP 306 places the call through an interconnect service, such as a call gateway 308, which operates as an interconnect or interface to a Plain Old Telephone System (POTS) 310. The signal from POTS 310 is then transmitted to analog phone 302, causing analog phone 302 to ring.

In this application, VoIP device 300 can be used as a "hotline" in which the user holding VoIP device 300 would be able to quickly call a specific number, such the person's house or cell phone. VoIP device 300 could be programmed to call the cell phone of a person responsible or who is the primary contact of the VoIP user, such as a parent, relative, or caretaker. The device can then be given to someone who may not be capable of actually dialing a number or selecting from multiple buttons to make a desired call, such as a child, elder relative, or a disabled/handicapped person. Using the pre-programmed device, the user can quickly call the other person by simply pushing a button.

Another advantage is that the device purchaser can prevent the device user from calling to unlimited numbers, as would be the case with VoIP or SIP phones with dial pads. This can be especially useful if the VoIP device is given to an older child or teenager. Such an application can also provide advantages to a service provider, such as in applications where the service provider pre-programs the button for a specific number, such as 911 or urgent care facilities in specific geographical areas. The service provider can then market and sell the VoIP devices to the elderly, people living alone, sick people, and the like so that they have a simple device to enable them to quickly and easily contact an emergency service or person.

Another application is for use as a gate intercom in which VoIP device 300 is fixed at a front gate or door of a house and depressing the button rings a phone in the house. VoIP device 300 would have a microphone and/or speaker to allow communication between the home occupants and visitors without the visitors knowing the actual phone number of the home.

In another embodiment, the VoIP device is used as a baby monitor. The VoIP device is programmed to open a communication channel with a device in the baby's room having a microphone. Once open, the user of the VoIP device can monitor and hear noises coming from the device in the baby's room.

In yet another embodiment, the VoIP device can be pre-programmed to call a service having pre-recorded audio, such as music, sounds, or speech (e.g., short messages, sayings, or stories). The VoIP device can also be pre-programmed to call a service that initiates a download of new audio messages, sounds, or music. One use of this type of VoIP device is to place it in a child's toy so that upon depressing a button, the child can hear music, sounds, or speech through the toy via the VoIP device.

Having thus described embodiments of the present invention, persons skilled in the art will recognize that changes may be made in form and detail without departing from the scope of the invention. For example, other applications may also be suitable for a simple VoIP device with button(s), but no dial pad or display, capable of being programmed with to make specific VoIP calls. Thus the invention is limited only by the following claims.

What is claimed is:

1. A method of operating a Voice over IP (VoIP) device comprising a button, the method comprising:
   receiving a first number to be associated with the button, wherein the button is pre-programmed with multiple numbers as determined by a user; and
   in response to sensing the button has been depressed, initiating a VoIP call to a second device associated with the first number, wherein the VoIP call is initiated only upon sensing that the button has been depressed.

2. The method of claim 1, wherein the VoIP call is a Session Initiation Protocol (SIP) call.

3. The method of claim 1, wherein the first number is received by a manufacturer of the device.

4. The method of claim 1, wherein the first number is received by a service provider of the VoIP call.

5. The method of claim 1, wherein the first number is for a caretaker of a child.

6. The method of claim 1, wherein the first number is for a 911 call.

7. The method of claim 1, wherein the second device includes a microphone and is intended to be placed in a baby's room, and wherein the VoIP call opens a communication channel between the second device and the VoIP device.

8. The method of claim 1, wherein the VoIP device is configured to be mounted outside a dwelling and the second device is intended to be located inside the dwelling, and wherein the VoIP device and the second device function as an intercom system.

9. A method of operating a Voice over IP (VoIP) device comprising a button, the method comprising:
   receiving a first number to be associated with the button; and
   in response to sensing the button has been depressed, initiating a VoIP call to a second device associated with the first number, wherein the VoIP call is initiated only upon sensing that the button has been depressed, wherein the first number is for a first time period, the method further comprising receiving a second number for a second time period, wherein in response to sensing the button has been depressed during the second time period, initiating a VoIP call to the second device.

10. The method of claim 1, wherein the VoIP device is attached to an inanimate object having no voice input portion, and wherein the VoIP call causes the second device to transmit a sound to the VoIP device.

11. The method of claim 10, wherein the inanimate object is a toy.

12. The method of claim 10, wherein the sound is a pre-recorded sound.

13. The method of claim 12, wherein the sound is speech or music.

14. The method of claim 10, wherein the sound is a downloadable sound.

15. A Voice over IP (VoIP) device, comprising:
a processor configured for wireless communication;
an audio component coupled to the processor;
a memory coupled to the processor for storing at least one programmed number associated with a second device; and
a button coupled to the processor and programmed with the number, wherein pressing the button initiates a VoIP call to the second device and wherein the only way to initiate a VoIP call from the VoIP device is by pressing the button, wherein the button is pre-programmed with multiple numbers as determined by a user.

16. The VoIP device of claim 15, wherein the number is programmed by a manufacturer of the VoIP device.

17. The VoIP device of claim 15, wherein the number is programmed by a service provider of the VoIP call.

18. The VoIP device of claim 15, wherein the number is for a caretaker of a child.

19. The VoIP device of claim 15, wherein the number is for a 911 call.

20. The VoIP device of claim 15, wherein the VoIP device is used as a baby monitor.

21. The VoIP device of claim 15, wherein the VoIP device and the second device are used as an intercom.

22. A Voice over IP (VoIP) device, comprising:
a processor configured for wireless communication;
an audio component coupled to the processor;
a memory coupled to the processor for storing at least one programmed number associated with a second device; and
a button coupled to the processor and programmed with the number, wherein pressing the button initiates a VoIP call to the second device and wherein the only way to initiate a VoIP call from the VoIP device is by pressing the button, wherein pressing the button during a first time interval initiates a VoIP call to the second device and pressing the button during a second time interval initiates a VoIP call to a third device.

23. The VoIP device of claim 13, wherein the VoIP device is attached to a toy.

24. The VoIP device of claim 15, wherein the VoIP device comprises only one audio component, and wherein the audio component is a speaker.

25. The VoIP device of claim 24, wherein pressing the button results in a sound emanating from the speaker.

26. The VoIP device of claim 25, wherein the sound is pre-recorded or downloadable content.

27. A Voice over IP (VoIP) device, comprising:
means for programming a button on the VoIP device with a first number, wherein the button is pre-programmed with multiple numbers as determined by a user; and
means for initiating a VoIP call to a second device associated with the first number in response to depressing the button, wherein the only way of initiating a call from the VoIP device is by depressing the button.

* * * * *